April 17, 1973  I. BLANK  3,728,314
CHEMICAL COMPOSITION FOR VISCOSITY CONTROL AND FILM
FORMING MATERIALS
Filed May 3, 1971
FIG. 1
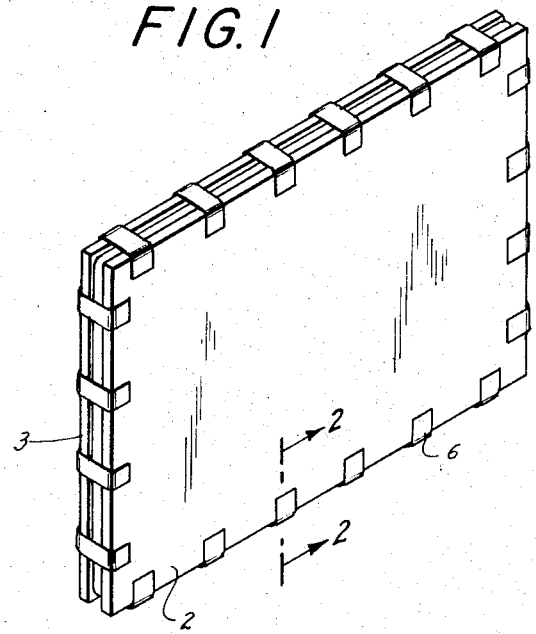
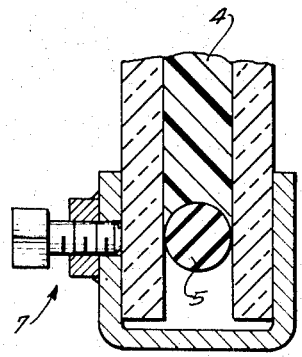
FIG. 2
INVENTOR
IZHAK BLANK
BY
Kane, Dalsimer, Kane, Sullivan & Kurucz,
ATTORNEYS United States Patent Office 3,728,314
Patented Apr. 17, 1973

3,728,314
CHEMICAL COMPOSITION FOR VISCOSITY CONTROL AND FILM FORMING MATERIALS
Izhak Blank, Haifa, Israel, assignor to Hydrophilics International, Inc., New York, N.Y.
Continuation-in-part of application Ser. No. 36,931, May 13, 1970. This application May 3, 1971, Ser. No. 139,544
Int. Cl. C08f 15/14, 15/18
U.S. Cl. 260—80.8                     7 Claims

ABSTRACT OF THE DISCLOSURE

A hydrophilic copolymer is formed through the bulk copolymerization of methyl methacrylate, an acrylic acid, and an acrylate plasticizer, in particular amounts, followed by treatment of the formed copolymer, in powder form, with an aqueous, basic material, such as ammonium hydroxide.

CROSS-REFERENCE TO RELATED APPLICATIONS

This application is a continuation-in-part of my copending application Ser. No. 36,931 for "Hydrophilic Copolymer," filed May 13, 1970, now abandoned.

BACKGROUND OF THE INVENTION

Acrylic polymers, such as polymethyl methacrylate, are completely hydrophobic and thus resistant to water absorption. However, if the materials are made to possess some water absorption capabilities, they are extremely useful, both as viscosity control additives and as film forming materials. In the former situation, they are valuable viscosity control additives for formulations such as agricultural sprays, paints, cosmetics, etc. In film forming, the materials may be used, for example, as carriers or binders for the sustained release of various materials.

Prior attempts to render such copolymers hydrophilic have met with limited success, in large part because emulsion or suspension polymerization methods have been employed. As a result, the molecular weights were relatively low and, thus, the water absorption capacity and certain other properties were limited. For example, in British Pat. No. 1,114,133, copolymers were formed employing approximately 8% acrylic acid and 92% methyl methacrylate and these materials were used in film preparation after neutralization.

Additionally, in "Surface Reactions of Copolymers," Seymour et al., Industrial & Engineering Chemistry, vol. 41, No. 7, pp. 1479 et seq., the treatment of similar copolymers with a basic solution is described. However, the conditions of treatment employed according to the article are extremely stringent, resulting in saponification of the material and loss of certain desirable properties.

Still further, a viscosity control agent for mineral oil is described in U.S. Pat. No. 3,379,146—Cupper et al., where the material is formed from a polymer of a long chain alkyl acrylate or methacrylate, an alkyl acrylate or methacrylate where the alkyl has from 1 to 4 carbon atoms, and acrylic or methacrylic acid. Here, however, the acid moieties of the polymer are neutralized with a specific amidazoline.

SUMMARY OF THE INVENTION

In accordance with the present invention methyl methacrylate, acrylic or methacrylic acid, and an acrylate plasticizer are copolymerized, in bulk. Generally, the amount of methyl methacrylate employed is from 25 to 50%, by volume, the acrylic or methacrylic acid is employed in amounts of from 40 to 60%, and the acrylate plasticizer, preferably ethyl hexyl acrylate, is employed in amounts of from about 5 to 20%, by volume. In addition, various other materials can be incorporated in the copolymerization mixture, including cross-linking agents, chain regulators, etc. Also incorporated is a polymerization catalyst, such as a peroxide, an azo compound, etc.

In bulk copolymerization, the copolymerization mixture is initially heated within the casting cell at a temperature of from about 40 to 65° C., preferably a temperature of from 44 to 55° C. The temperature of the copolymerization mixture is then raised to a temperature of about 80° C. to 95° C. When polymerization has been completed, the copolymer is cooled and is removed from the casting cell. Upon removal from the casting cell, the copolymer is hydrophobic and can be left in water for many hours with no significant increase in weight. However, in order to form the products of the present invention, the copolymer is treated with a basic aqueous solution, such as a solution of ammonium hydroxide and water, following grinding of the mixture.

Generally, the copolymer is ground into fine particles which are placed into contact with the basic solution. They are left in contact with this solution for a sufficient period of time to neutralize the acid groups present, generally achieving a final pH of 7 or 8. Neither the time nor the conditions are sufficient to allow for saponification of these acid groups.

The polymerization, in bulk, is generally carried out in a casting cell and, as indicated, at relatively low temperatures. The resulting copolymerized materials have an extremely high molecular weight, with an intrinsic viscosity in methyl ethyl ketone at 25° C. of about 2.5, or more, and this provides the resulting material with a number of properties not present in the materials of the prior art. For example, the additional molecular weight lends additional stability to the polymer, including stability to ultraviolet light, visible light, and chemical compounds including chlorinated solvents. In this regard, the material is extremely useful as a viscosity improving agent, for example, for agricultural sprays.

Additionally, the extremely high molecular weight of the copolymer allows for the incorporation of greater amounts, than previously possible, of the acrylic and methacrylic acid. As such, the material lends extremely high water absorption capacity to films which are formed from it. However, because of the length, the hydrophobic portion of the polymer is even more hydrophobic than with prior art materials.

The plasticizer provides a degree of elasticity to solutions of the mateerial when it is used in viscosity control. This aids in lending body to the solution to which it is added. It also permits the formation of continuous films on removal of the water.

The hydrophilic copolymers which are the subject of this invention are extremely useful in film forming and as thickeners for various products, including agricultural sprays, paints, cosmetics, detergent, etc. Such materials are generally water based.

BRIEF DESCRIPTION OF THE DRAWINGS

In the accompanying drawings:
FIG. 1 is a perspective view of a standard rectangular casting cell; and
FIG. 2 is a fragmentary, sectional view of the casting cell of FIG. 1 along the line 2—2.

DESCRIPTION OF THE PREFERRED EMBODIMENTS

As described, the present invention relates to a hydrophilic acrylic copolymer, generally formed through bulk polymerization of the copolymerization mixture in a casting cell. The casting cell illustrated in FIG. 1 is a version which can be employed for many purposes. The cell 1 includes two planar surfaces 2 and 3 spaced apart to provide a hollow 4 in which the copolymerization mixture is polymerized. The planar surfaces 2 and 3 are formed of suitable materials, such as glass, polypropylene, polyethylene, etc. which will allow removal of the polymerized mixture.

These planar surfaces 2 and 3 are held spaced apart by a gasket 5, shown in circular section, through this configuration is not essential. The gasket is formed of a suitable material which will not interfere with the polymerization reaction and such materials include polyvinylchloride and rubber. The casting cell is held together through use of a plurality of clamps 6 which hold the plates together along the periphery. A suitable type of clamp is the set screw clamp 7 illustrated in FIG. 2.

The copolymerization mixture is placed within the space 4, as previously described, in order to polymerize, in a manner to be described further in this specification, after the casting cell has been assembled. When polymerization is completed the clamps are removed from the cell, and the planar surfaces and gasket are removed to provide the final polymer. It will, of course, be recognized that the shape of the casting cell is not critical to the present invention.

The copolymerization mixture includes, as essential components, methyl methacrylate, a member selected from the group consisting of acrylic acid and methacrylic acid, and an internal acrylate plasticizer. A preferred plasticizer is ethyl hexyl acrylate. The amount of methyl methacrylate employed varies from 25 to 50%, by volume, preferably from 25 to 35%. The amount of acrylic or methacrylic acid employed should be between 40 and 60%, by volume, preferably between 50 and 60%, while the amount of plasticizer employed is between 5 and 20%, preferably from 10 to 15%. The viscosity of the solutions obtained employing the copolymer of the present invention can be varied over a wide range.

In particular, the viscosity of solutions obtained employing the copolymer of the present invention can be controlled by employing a chain regulator in the copolymer, in an amount of 0.1 to 1.0%. A particularly preferred chain regulator is dodecanthiol. For example, a copolymer formed from 35% methyl methacrylate, 55% acrylic acid, and 10% ethyl hexyl acrylate yielded, after neutralization with ammonia, a 1% water solution with a viscosity of between 2,000 and 2,500 centipoise. When a quantity of 1% dodecanthiol was incorporated in the copolymerization mixture, and treatment was otherwise the same, the resulting 1% aqueous solution had a visosity of 60 centipoise. Similarly, methacrylic acid provides solutions having lower viscosities than when the copolymer is formed with acrylic acid.

The copolymerization mixture may also include various components to achieve particular purposes. For example, cross-linking agents which increase the rigidity of the material can be employed, but only in small amounts as the hydrophilic properties of the copolymer are reduced. Cross-linking agents which can be used include glycol dimethacrylate, alyl methacrylate, and divinylbenzene. The amounts should be between 0.05% and 0.5%.

Other plasticizers can be employed in place of the ethyl hexyl acrylate referred to above, or the ethyl hexyl acrylate can be mixed with one or more of the other plasticizers. The total amount employed should be within the 5 to 20% range set forth. Among the other plasticizers are butyl acrylate, 2-ethyl hexyl methacrylate, stearyl acrylate, and other long chain esters of acrylic and methacrylic acid. Long chain esters of acrylic and methacrylic acid are those having from 6 to 18 carbon atoms in the alcoholic portion of the ester.

A further component of the copolymerization mixture is a copolymerization catalyst. In general, these catalysts are selected from the class consisting of azo compounds and peroxides. In particular, the catalyst can be $\alpha,\alpha'$-azodiisobutyronitrile, which is the preferred catalyst, benzoyl peroxide, or lauryl peroxide. Various other catalysts will be apparent to those skilled in the art. Additionally, the polymerization can be catalyzed by ultraviolet radiation. The preferred catalyst is employed because of its uniformity of action. The amount of catalyst used, regardless of the particular catalyst, can vary between 0.01% and 0.12%, by weight, based upon the total of the comonomers. Preferably, the catalyst is employed in amounts ranging from 0.03% to 0.05%, by weight, based upon the combined weight of the comonomers.

The casting cells illustrated in FIGS. 1 and 2, and other casting cells which may be formed, can be formed of any of a variety of materials to which the copolymerized mixture will not adhere, so as to provide for easy removal, and which will not react with the reactants under the reaction conditions. Such materials of construction include glass, polyethylene, polypropylene, polytetrafluoroethylene, stainless steel, and others. Obviously, in addition to the properties previously mentioned, because the copolymerization is carried out at elevated temperatures, the material of which the casting cell is formed must provide for good heat transfer.

Following polymerization, the casting cell is opened and the copolymerized material is removed. Preferably, the resulting copolymer is finely ground in order to provide for easier dispersion in the basic solution. The solution employed to treat the copolymerized material is a water solution of ammonium hydroxide, sodium hydroxide, potassium hydroxide, calcium hydroxide, ethanol amines, sodium tripolyphosphate, or others. The copolymer is generally ground to a fine powder to provide for dispersion. The granules of this powder may vary in size from about 60 microns to 80 microns, or about 200 mesh. The finely ground powder is then suspended in a basic aqueous solution having a concentration of from 0.5% to 2% of one of the previously referenced basic materials, for from about 1 to 20 minutes. While the dissolution can be carried out at any temperature, generally the temperature varies from room temperature to 60° C. As previously indicated, the treatment with the basic solution is essentially a neutralization and results in a final solution having a pH of from about 7 to 8.

In order that those skilled in the art may be better enabled to practice the present invention, the following examples are given by way of illustration. All parts in these examples, unless otherwise indicated, are by volume.

Example 1

A copolymer was formed in a casting cell as indicated in the figures employing 35 parts of methyl methacrylate, 55 parts of acrylic acid, and 10 parts of ethyl hexyl acrylate. The polymerization was controlled at 45 to 55° C. over a period of 24 hours, but during the last three hours the temperature was raised to 80° C. The polymer was removed and ground to −200 mesh. The powder was vigorously stirred in water with the simultaneous addition of ammonium hydroxide to provide a concentration of ammonium hydroxide in the water of 1%. An amount of polymer equal to 1% of the total solution was added and the final viscosity was found to be 2,000 centipoise. On prolonged standing, the viscosity rose. The material was found to be an excellent viscosity improver for aqueous solutions.

Example 2

In the same manner as in Example 1, a copolymer was formed employing 34 parts methyl methacrylate, 55 parts acrylic acid, 10 parts ethyl hexyl acrylate, and 1 part 2-dodecanthiol. With a 1% polymer concentration, the resulting solution was found to have a viscosity of 60 centipoises. The solution could be cast on a glass plate to form a clear, uniform film of the hydrophilic copolymer.

Example 3

In the same manner as in Example 1, a copolymer was formed employing 25 parts methyl methacrylate, 60 parts acrylic acid, and 15 parts ethyl hexyl acrylate. A 1% solution of this polymer had a viscosity of 4,000 centipoises.

Example 4

A copolymer was formed in the same manner as in Example 1 employing 35 parts methyl methacrylate, 55 parts methacrylic acid, and 10 parts ethyl hexyl acrylate. A 1% solution of the resulting treated copolymer had a viscosity of 60 centipoises.

Ammonium hydroxide was referred to in each of the examples as the material for neutralizing the acidic groups of the copolymer. However, other bases can be used in place of the aqueous ammonium hydroxide including sodium hydroxide, potassium hydroxide, triethanolamine, etc. The concentrations must be controlled so as to prevent saponification of the ester groups in the copolymer. So long as this is done, while there are some variations in the ultimate viscosity of the material, the variations are not great.

In each example, the catalyst used was $\alpha,\alpha'$-azodiisobutyronitrile in the amount of 0.05%, by weight, based upon the total monomers.

Thus, an improved method for forming hydrophilic copolymers, and such copolymers have been shown. These materials are useful as viscosity stabilization agents for aqueous solutions and as film forming agents.

I claim:

1. A hydrophilic copolymer formed by the bulk copolymerization, at an initial temperature of 40° C. to 65° C. and a final temperature of about 80° C. to 95° C. in a casting cell, of a mixture comprising from 25 to 50%, by volume, methyl methacrylate, from 40 to 60%, by volume, of a member selected from the class consisting of acrylic acid and methacrylic acid, and from 5 to 20 parts, by volume, of an ester of acrylic or methacrylic acid having from 6 to 18 carbon atoms in the alcoholic group, the acid groups of said copolymer having been completely neutralized with a mild, aqueous basic solution, the ester groups on the copolymer being unchanged.

2. The copolymer of claim 1 wherein the methyl methacrylate is contained in amounts of from 25 to 35%, a member selected from the class consisting of acrylic acid and methacrylic acid is employed in amounts of from 10 to 15%.

3. The copolymer of claim 1 having incorporated in the structure, in addition, from 0.1 to 1.0% of a chain regulator.

4. The copolymer of claim 1 employing acrylic acid.

5. The copolymer of claim 1 employing methacrylic acid.

6. The copolymer of claim 1 wherein the ester of acrylic or methacrylic acid is ethyl hexyl acrylate.

7. A film formed from the copolymer of claim 1.

References Cited

UNITED STATES PATENTS

| | | | |
|---|---|---|---|
| 2,795,564 | 6/1957 | Conn et al. | 260—80.8 |
| 3,431,226 | 3/1969 | Warson et al. | 260—80.8 |
| 3,577,517 | 5/1971 | Kubot et al. | 260—80.8 |
| 3,607,615 | 9/1971 | Hatakeyama et al. | 260—80.8 |

HARRY WONG, Jr., Primary Examiner

U.S. Cl. X.R.

117—124; 204—159.22; 260—29.6 TA; 424—81